(12) United States Patent
Kim et al.

(10) Patent No.: US 11,279,625 B2
(45) Date of Patent: *Mar. 22, 2022

(54) METHOD OF PREPARING METAL OXIDE-SILICA COMPOSITE AEROGEL AND METAL OXIDE-SILICA COMPOSITE AEROGEL PREPARED BY THE SAME

(71) Applicant: LG CHEM, LTD., Seoul (KR)

(72) Inventors: Jong Hun Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/492,017

(22) PCT Filed: Sep. 7, 2018

(86) PCT No.: PCT/KR2018/010522
§ 371 (c)(1),
(2) Date: Sep. 6, 2019

(87) PCT Pub. No.: WO2019/050347
PCT Pub. Date: Mar. 14, 2019

(65) Prior Publication Data
US 2020/0010328 A1 Jan. 9, 2020

(30) Foreign Application Priority Data
Sep. 8, 2017 (KR) .................. 10-2017-0115274
Sep. 8, 2017 (KR) .................. 10-2017-0115275

(51) Int. Cl.
*C01B 33/24* (2006.01)
*B01J 13/00* (2006.01)

(52) U.S. Cl.
CPC .......... *C01B 33/24* (2013.01); *B01J 13/0091* (2013.01); *C01P 2006/10* (2013.01); *C01P 2006/14* (2013.01); *C01P 2006/17* (2013.01)

(58) Field of Classification Search
CPC . C01B 33/24; C01B 33/1585; C01B 33/1546; C01B 33/325; C01B 33/157;
(Continued)

(56) References Cited

U.S. PATENT DOCUMENTS 3,131,072 A 4/1964 Taulli
6,210,751 B1 4/2001 Schwertfeger
(Continued)

FOREIGN PATENT DOCUMENTS

EP 3647266 A1 5/2020
JP S56-120508 9/1981
(Continued)

OTHER PUBLICATIONS

Kr20170071285, Kang, Jun. 2017, see machine transaltion in english.*
(Continued)

*Primary Examiner* — Smita S Patel
(74) *Attorney, Agent, or Firm* — Dentons US LLP

(57) ABSTRACT

Provided is a method of preparing a metal oxide-silica composite aerogel and a metal oxide-silica composite aerogel having an excellent weight reduction property prepared by the method. The method comprises adding an acid catalyst to a first water glass solution to prepare an acidic water glass solution (step 1); adding a metal ion solution to the acidic water glass solution to prepare a precursor solution (step 2); and adding a second water glass solution to the precursor solution and performing a gelation reaction (step 3).

16 Claims, 4 Drawing Sheets

(58) Field of Classification Search
CPC ..... C01B 33/158; C01B 33/154; C01B 33/32; C01B 33/16; B01J 13/0091; B01J 13/00; C01P 2006/10; C01P 2006/14; C01P 2006/17

See application file for complete search history.

(56) References Cited

U.S. PATENT DOCUMENTS

| | | | |
|---|---|---|---|
| 2009/0317619 A1 | 12/2009 | Di Monte et al. | |
| 2011/0000370 A1* | 1/2011 | Norberg | B01D 53/62 |
| | | | 95/90 |
| 2014/0057111 A1 | 2/2014 | Tomimatsu Fujimoto et al. | |
| 2018/0127278 A1 | 5/2018 | Kim et al. | |
| 2018/0127279 A1 | 5/2018 | Kim et al. | |
| 2018/0193825 A1* | 7/2018 | Kim | C01B 33/158 |
| 2018/0194634 A1* | 7/2018 | Kang | C01B 33/158 |
| 2018/0208474 A1 | 7/2018 | Kim et al. | |
| 2020/0313187 A1 | 10/2020 | Tabata et al. | |

FOREIGN PATENT DOCUMENTS

| | | |
|---|---|---|
| JP | H09-30809 | 2/1997 |
| KR | 10-1999-0067369 | 8/1999 |
| KR | 10-2009-0115714 | 11/2009 |
| KR | 10-2011-0064986 | 6/2011 |
| KR | 10-2016-0141670 | 12/2016 |
| KR | 10-20160141671 | 12/2016 |
| KR | 10-2017-0047173 | 5/2017 |
| KR | 10-2017-0068391 | 6/2017 |
| KR | 10-2017-0071285 | 6/2017 |
| WO | 2008-123606 | 10/2008 |
| WO | 2012-147812 | 11/2012 |
| WO | 2019-050345 | 3/2019 |

OTHER PUBLICATIONS

KR20170047173, kirn, May 2017, see maching translation in english.*

Bertier et al., "On the use and abuse of N2 physisorption for the characterization of the pore structure of shales," The Clay Minerals Society Workshop Lectures Series vol. 21, Chapter 12, pp. 151-161 (2016).

Toritsu Seisakusho Co., Ltd., "Total pore volume and average pore diameter in gas adsorption method," published online on Sep. 10, 2020, retrieved from <https://www.an.shimadzu.co.jp/powder/lecture/practice/p02/lesson14.htm> [English Translation included].

Shi, F. et al., "Synthesis of highly porous SiO2-(WO3)x TiO2 composite aerogels using bacterial cellulose as template with solvothermal assisted crystallization," Chemical Engineering Journal 292:105-112 (2016).

* cited by examiner

METHOD OF PREPARING METAL OXIDE-SILICA COMPOSITE AEROGEL AND METAL OXIDE-SILICA COMPOSITE AEROGEL PREPARED BY THE SAME

CROSS-REFERENCE TO RELATED APPLICATION

This application is a National Stage Application of International Application No. PCT/KR2018/010522 filed on Sep. 7, 2018, which claims the priority benefit of Korean Patent Application Nos. 10-2017-0115274 and 10-2017-0115275, filed on Sep. 8, 2017 in the Korean Intellectual Property Office, the disclosure of each of which is incorporated herein by reference.

TECHNICAL FIELD

The present invention relates to a method of preparing a lightweight metal oxide-silica composite aerogel and a metal oxide-silica composite aerogel prepared by the same.

BACKGROUND

A silica aerogel, which is a super-porous and high-specific-surface-area material having a porosity of about 90 to 99.9% and a pore size of 1 to 100 nm, has excellent characteristics such as ultra-light weight/super insulation/super low dielectricity. Accordingly, research into the development of an aerogel material and application thereof to transparent insulating materials, eco-friendly high-temperature-resistance insulating materials, extremely low dielectric thin films for highly integrated devices, catalysts, catalyst carriers, electrodes for supercapacitors, electrode materials for seawater desalination, and the like is actively underway.

The greatest advantage of a silica aerogel is super-insulation characterized by a thermal conductivity of 0.300 W/mK or less which is lower than thermal conductivities of conventional organic insulating materials such as Styrofoam. In addition, problems, such as fire vulnerability and generation of harmful gases in the case of fire, which are fatal disadvantages of organic insulating materials, can be addressed.

Meanwhile, to further increase a utilization range of a silica aerogel, a method of adding mechanical properties to original properties of the silica aerogel has been studied. For example, a metal oxide-silica composite aerogel into which a metal oxide is introduced has been developed.

Conventional general processes of preparing a metal oxide-silica composite aerogel are disadvantageous in that they are complicated, a large amount of wastewater is generated due to the use of an organic solvent when the solvent is replaced, and an excessive amount of surface modifier is consumed in a surface modification step.

To address the problems, research into a low-cost production process in which a high-cost surface substitution process and pyrolysis process requiring an organic solvent and a surface modifier are omitted has recently been conducted.

In particular, research into a method of preparing a metal oxide-silica composite aerogel, the method including a step of adding a metal ion solution and an acid catalyst to a water glass solution and reacting the same (step 1); and a step of washing and drying a wet gel (step 2), has been conducted.

However, a metal oxide-silica composite aerogel prepared by the method has a broad pore distribution due to a non-uniform reaction, caused by the formation of a composite structure of a metal oxide and silica, and a low effective pore volume due to severe contraction during drying caused by omission of a surface modification reaction of stabilizing particle surfaces.

A metal oxide-silica composite aerogel has an open-pore structure due to the formation of a network structure among primary particles thereof and is lightweight due to the limitation of penetration of a polymer resin into the pore. The volume of the effective pores, into which penetration of a polymer resin is limited, is an important factor in using the metal oxide-silica composite aerogel as an additive for weight reduction. However, since such a metal oxide-silica composite aerogel has a low effective pore volume as described above, the properties thereof as an additive for weight reduction are poor.

Therefore, there is an urgent need for a process of preparing a metal oxide-silica composite aerogel capable of improving the uniformity of reaction between a metal oxide and silica to have a narrow pore distribution, strengthening an internal network structure to reduce contraction during drying and, accordingly, improving a pore volume and an effective density to allow application as an additive for weight reduction.

DISCLOSURE

Technical Problem

Therefore, the present invention has been made in view of the above problems, and it is one object of the present invention to provide a method of preparing a metal oxide-silica composite aerogel having a more uniform pore structure, a strengthened network structure, and an excellent weight-lightening property due to an increased pore volume.

It is another object of the present invention to provide a metal oxide-silica composite aerogel prepared by the method.

Technical Solution

In accordance with an aspect of the present invention, the above and other objects can be accomplished by the provision of a method of preparing a metal oxide-silica composite aerogel, the method including a step of adding an acid catalyst to a first water glass solution to prepare an acidic water glass solution (step 1); a step of adding a metal ion solution to the acidic water glass solution to prepare a precursor solution (step 2); and a step of adding a second water glass solution to the precursor solution and performing a gelation reaction (step 3).

In accordance with another aspect of the present invention, there is provided a metal oxide-silica composite aerogel having a full width at half maximum (FWHM) value of 34 nm or less in a pore diameter-dependent distribution, and an effective pore volume of 0.9 $cm^3/g$ or more.

Advantageous Effects

A method of preparing a metal oxide-silica composite aerogel according to the present invention can reduce production costs due to omission of a surface substitution process and a pyrolysis process, thus providing high economic efficiency. In addition, the method can improve the uniformity of a reaction between a metal oxide and silica. Further, the method can strengthen an internal network structure, thereby suppressing contraction during drying and thus effectively preventing the collapse of pore structures.

In addition, since a metal oxide-silica composite aerogel prepared by the method according to the present invention has a uniform pore structure and a further strengthened network structure, pore characteristics, such as a specific surface area, a pore volume, a pore uniformity, an effective pore volume, and the effective density of single particles, of the metal oxide-silica composite aerogel can be remarkably improved. Accordingly, the metal oxide-silica composite aerogel can be ultra-lightweight.

Therefore, the method according to an embodiment of the present invention and a metal oxide-silica composite aerogel prepared by the method can be usefully used in related industries, e.g., silica aerogel-related industries. In particular, a metal oxide-silica composite aerogel prepared by the method can be used as an additive for weight reduction.

DESCRIPTION OF DRAWINGS

The attached drawings are provided to exemplify particular embodiments of the present invention and assist understanding of the technical idea of the present invention along with the aforementioned description, and the present invention should not be limited to particulars described in the drawings.

MODES OF THE INVENTION

Now, the present invention will be described in more detail to facilitate understanding of the present invention.

Terms or words used in the specification and the appended claims shall not be limited to common or dictionary meanings, and have meanings corresponding to technical aspects of the embodiments of the present invention so as to most suitably express the embodiments of the present invention.

A conventional general process of preparing a metal oxide-silica composite aerogel is complicated because it includes an aging step, a solvent replacement step, and a surface modification step and has problems such as a large amount of wastewater generated due to the use of an organic solvent when the solvent is replaced, and use of a large amount of surface modifier in the surface modification step.

Figure 1:
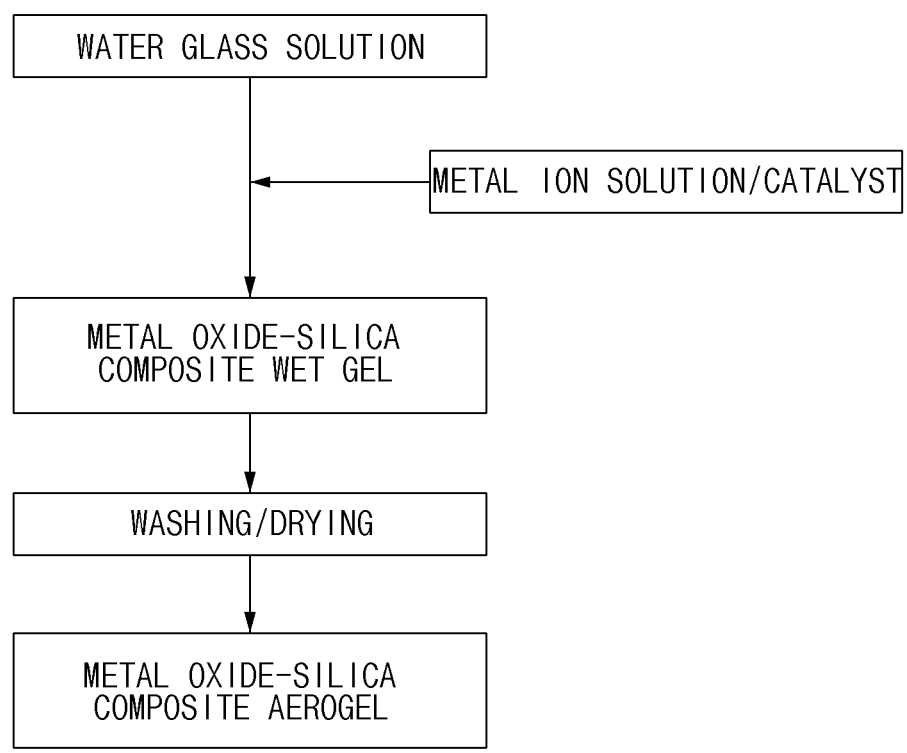
FIG. 1 is a flowchart schematically illustrating a conventional general method of preparing a metal oxide-silica composite aerogel.

To address the problems, a low-cost production process, in which a high-cost surface substitution process and pyrolysis process requiring an organic solvent and a surface modifier are omitted, as shown in FIG. 1 has been proposed. However, a metal oxide-silica composite aerogel prepared by the method has a broad pore distribution due to a non-uniform reaction, caused by the formation of a composite structure of a metal oxide and silica, and a low effective pore volume due to severe contraction during drying caused by omission of a surface modification reaction of stabilizing particle surfaces. Accordingly, the performance of the metal oxide-silica composite aerogel is too poor for use as an additive for weight reduction.

Therefore, the present invention provides a method of preparing a metal oxide-silica composite aerogel capable of addressing conventional problems, having a uniform pore structure and a strengthened network structure, and an improved specific surface area, pore volume, effective density, and the like.

Hereinafter, a method of preparing a metal oxide-silica composite aerogel according to an embodiment of the present invention is described in detail with reference to FIG. 2.

Figure 2:
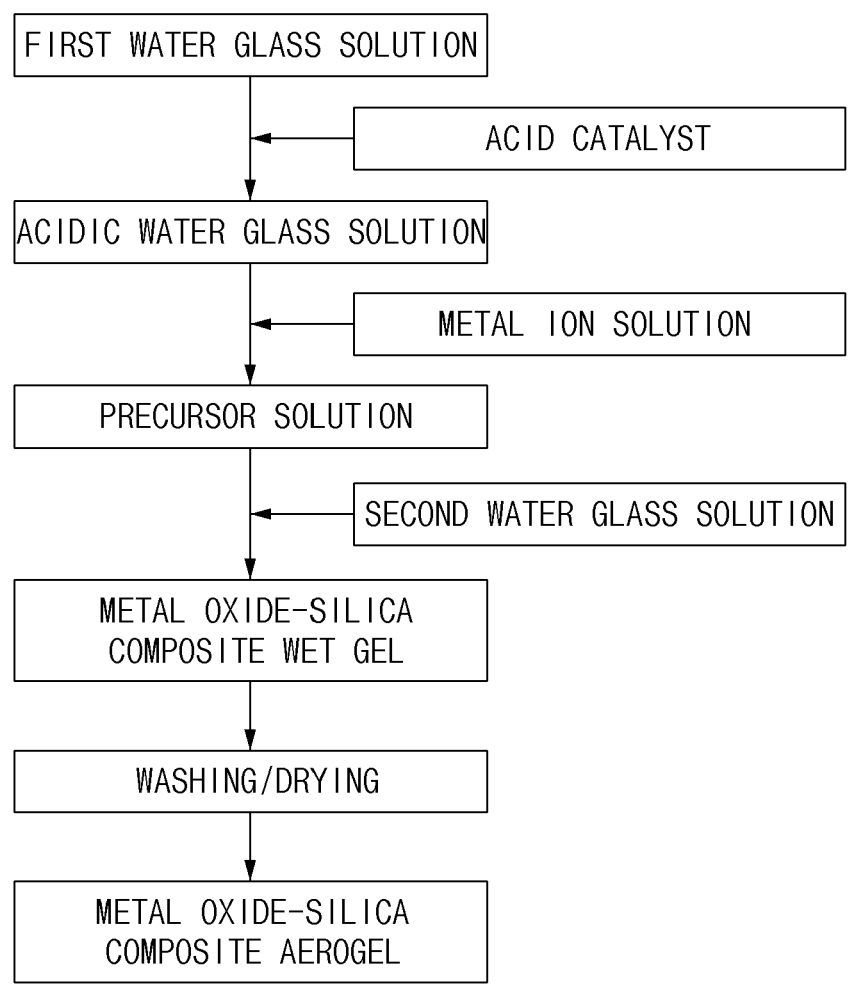
FIG. 2 is a flowchart schematically illustrating a method of preparing a metal oxide-silica composite aerogel according to an embodiment of the present invention.

First, FIG. 2 is a flowchart illustrating a method of preparing a metal oxide-silica composite aerogel according to an embodiment of the present invention. The method includes a step of adding an acid catalyst to a first water glass solution to prepare an acidic water glass solution (step 1); a step of adding a metal ion solution to the acidic water glass solution to prepare a precursor solution (step 2); and a step of adding a second water glass solution to the precursor solution and gelating the same (step 3). A high concentration second water glass solution is slowly added to the precursor solution to induce a slow gelation reaction, thereby preparing a gelated material having a strengthened network structure. As such, since the method of preparing a metal oxide-silica composite aerogel according to the present invention does not include a solvent replacement process or a surface modification and a pyrolysis process, a process of the method is relatively simple, thereby increasing production efficiency. In addition, the method can reduce production costs, thereby increasing economic efficiency. In addition, a composite aerogel prepared according to the method has improved mechanical properties due to excellent uniformity of a reaction between a metal oxide and silica. In particular, due to a further strengthened network structure of the composite aerogel, the volume of effective pores, which inhibit penetration of a polymer resin, and an effective density are improved, and pore characteristics, a specific surface area, and the like are significantly improved. Accordingly, the composite aerogel can be used usefully as an additive for weight reduction.

Here, a metal oxide-silica composite wet gel can be obtained through steps 1 to 3.

"Water glass solution" in the terms, "first water glass solution" and "second water glass solution," used in the present invention can be a dilute solution prepared by adding distilled water to water glass and mixing the same. The water glass can be sodium silicate ($Na_2SiO_3$) as an alkali silicate obtained by melting silicon dioxide ($SiO_2$) and an alkali. The "first" and "second" can be provided to distinguish the order of addition. That is, the "first water glass solution" and "second water glass solution" can indicate water glass solutions sequentially added. In addition, as needed, the "first water glass solution" and "second water glass solution" can be used to indicate different water glass concentrations in the water glass solutions.

In the present invention, "gelation reaction" can indicate a sol-gel reaction. The "sol-gel reaction" can indicate a reaction of forming a network structure from silicon or a metal alkoxide unit precursor material, e.g., a reaction wherein reactants are connected to each other and grow through a condensation reaction wherein one water molecule of two functional hydroxy groups simultaneously forms a metal-oxygen bond, after a hydrolysis reaction of forming a functional hydroxy (—OH) group on a metal by reacting silicon with water.

Here, the network structure can be a planar net structure in which a specific polygon having one or more kinds of atomic arrays is connected, or a structure of sharing vertices, edges, and faces of a specific polyhedron to form a three-dimensional skeletal structure.

In the present invention, the term "precursor solution" can an acidic reactant solution that is prepared by mixing a metal ion solution with an acidic water glass solution prepared by adding an acid catalyst to a first water glass solution and thus includes metal ions. The precursor solution can be a sol-formulated precursor material as a reactant of a sol-gel reaction.

In the method according to an embodiment of the present invention, step 1 is a step of preparing an acidic water glass solution. In step 1, an acid catalyst is added to a first water glass solution, thereby preparing an acidic water glass solution.

The first water glass solution can have a concentration of 0.01 M to 2.0 M, preferably 0.05 M to 1.2 M, more preferably 0.1 M to 0.5 M. Here, the concentration of the first water glass solution means the concentration of water glass in the first water glass solution. That is, the first water glass solution can contain water glass within the concentration range.

When the concentration of water glass in the first water glass solution is less than 0.01 M, mixing is not uniformly performed when mixed with a metal ion in step 2 due to an excessively low concentration, whereby the uniformity of a reaction between a metal oxide and silica can be decreased. When the concentration of the water glass is greater than 2.0 M, a large amount of acid catalyst is used to maintain an acidic water glass solution due to high basicity, whereby economic efficiency is low in terms of production efficiency and production costs. In addition, since the second water glass solution should be added in an excess amount for a pH suitable for reaction when the second water glass solution is added, the properties of a prepared metal oxide-silica composite aerogel may be deteriorated. When the second water glass solution is added in a suitable amount, not an excess amount, addition of a basic catalyst may be required, which may complicate the process and cause an economic efficiency decrease in terms of production efficiency and production costs.

In step 1, the pH of the acidic water glass solution can be 0.1 to 2.9, preferably 0.3 to 2, more preferably 0.5 to 1.5. The pH can be adjusted using an acid catalyst.

pH, which indicates the concentration of hydrogen ions or acidity, can be used as a numerical value indicating the degree of acidity or basicity of a material and can be an inverse value of a logarithm of the dissociation concentration of hydrogen ions.

When the pH of the acidic water glass solution is higher than 2.9, a gelation reaction of the first water glass solution is performed, whereby an aggregate can be formed. In addition, a precipitation reaction can occur when the metal ion solution is added in step 2, whereby an aggregate mixed with metal ions can be generated. The aggregate can be a gelated material or a precipitate.

When a gelation reaction of the first water glass solution is performed and thus an aggregate is formed, a prepared aerogel can have a weak network structure and large pores, whereby contraction can increase during drying and thus pore characteristics may be deteriorated. In addition, the uniformity of a reaction with a metal oxide may be significantly decreased, whereby the mechanical properties and the like of a prepared aerogel may be deteriorated. In addition, also when an aggregate mixed with metal ions is formed, the metal oxide and silica in the water glass solution are not uniformly mixed, whereby pore characteristics, mechanical properties, and the like of a prepared aerogel may be deteriorated.

Here, an added acid catalyst type is not specifically limited and can be, for example, one or more selected from the group consisting of hydrochloric acid, nitric acid, acetic acid, sulfuric acid, and hydrofluoric acid, preferably hydrochloric acid. An acid catalyst content in the acidic water glass solution is not specifically limited and can be included in an amount at which the pH of the acidic water glass solution is within the above range.

In the method according to an embodiment of the present invention, step 2 is a step of preparing a precursor solution. The precursor solution can be prepared by adding a metal ion solution to the acidic water glass solution and mixing the same.

The metal ion solution can be prepared by dissolving a metal salt, as a raw material, in a solvent such that a metal oxide is formed in a finally produced metal oxide-silica composite aerogel. The concentration of the metal ion solution can be 0.01 M to 2.0 M, preferably 0.01 M to 1.2 M, more preferably 0.01 M to 0.2 M. Here, the concentration of the metal ion solution means the concentration of metal ions in the metal ion solution.

When the concentration of metal ions in the metal ion solution is less than 0.01 M, silica may not be uniformly mixed in the water glass solution and pore characteristics of a prepared aerogel may be deteriorated, due to an excessively low concentration. In addition, due to an excessively low content of the metal oxide in the aerogel, property improvement effects, such as mechanical property improvement, according to the formation of the metal oxide may not be accomplished. When the concentration of the metal is greater than 2.0 M, the porous structure of the prepared aerogel may be impaired, whereby properties in terms of a pore volume may be deteriorated.

A solvent for the metal ion solution is not specifically limited so long as a metal salt can be sufficiently dissolved, and may be, for example, distilled water.

The metal ion solution can include particularly ions of one or more selected from the group consisting of alkali metals, alkaline earth metals, lanthanides, actinides, transition metals, and metals in Group 13 (IIIA), more particularly ions of one or more selected from the group consisting of calcium (Ca), magnesium (Mg), copper (Cu), zinc (Zn), manganese (Mn), cadmium (Cd), lead (Pb), nickel (Ni), chromium (Cr), silver (Ag), titanium (Ti), vanadium (V), cobalt (Co), molybdenum (Mo), tin (Sn), antimony (Sb), strontium (Sr), barium (Ba), and tungsten (W). The metal salts forming metal ions can be appropriately selected and used according to the use of the metal oxide-silica composite aerogel. In the present invention, the metal salt can preferably include calcium and magnesium as metals.

In addition, the metal salt can be one or more metal salts selected from the group consisting of a chloride, a nitrate, a sulfate, and hydrates thereof formed using the metals. More particularly, the metal salt can be calcium chloride dihydrate ($CaCl_2 \cdot 2H_2O$) and magnesium chloride hexahydrate ($MgCl_2 \cdot 6H_2O$).

That is, in an embodiment of the present invention, the metal ion solution can be a binary metal ion solution including calcium ions ($Ca^{2+}$) and magnesium ions ($Mg^{2+}$). Here, a molar ratio of the calcium ions ($Ca^{2+}$) to the magnesium ions ($Mg^{2+}$) can be 1:1 to 1:20, preferably 1:1 to 1:15, more preferably 1:1 to 1:12.

A precipitation reaction does not occur even when the metal ion solution is added to the acidic water glass solution prepared in step 1 and, accordingly, silica of the water glass solution can be uniformly mixed with the metal in a solution phase, thereby improving reaction uniformity. This can be a result obtained by first adding the acid catalyst in step 1 to adjust the pH of the first water glass solution.

In addition, the metal ion solution can be added in an amount at which the metal ions in the solution can easily react with the water glass in the water glass solution. In particular, a volume ratio of the metal ion solution to the water glass solution can be 5:1 to 1:5. More particularly, a volume ratio of the metal ion solution to the water glass solution can be 3:1 to 1:3, even more particularly 2:1 to 1:2.

In addition, the metal ion solution can be added in an amount at which a molar ratio of silicon (Si) in the water glass solution to metal ions ($Mg^{2+}$ and $Ca^{2+}$) in the metal ion solution is 1:0.3 to 1:2.5.

The process of adding and mixing the metal ion solution is not specifically limited and, for example, can be a process of mixing through stirring. The stirring can be performed using a magnetic bar or mechanical mixer.

Here, the concentration of the precursor solution can be 0.1 to 3.9% by weight, preferably 0.1 to 3% by weight, more preferably 0.5 to 2.5% by weight, based on 1 L of a solvent. Here, the "% by weight" is the weight of a solute in the precursor solution. The solute includes all of water glass, metal ions, and the like dissolved in a solvent of the precursor solution. When the concentration of the precursor solution is 0.1 to 3.9% by weight, a large number of small pores are formed, whereby a ratio of effective pores, into which penetration of a polymer resin is limited, is increased and the uniformity of pores is improved. Accordingly, within the concentration range, a weight reduction property of the prepared metal oxide-silica composite aerogel is further improved when it is applied as an additive.

Here, the solvent is not specifically limited so long as it can sufficiently dissolve the solute. The solvent can be, for example, distilled water.

In the method according to an embodiment of the present invention, step 3 is a step of gelating the precursor solution. A silica precursor can be added to the precursor solution of step 2, followed by a gelation reaction.

In an embodiment of the present invention, a silicon-containing alkoxide-based compound such as tetramethyl orthosilicate (TMOS), tetraethyl orthosilicate (TEOS), or methyl triethyl orthosilicate can be used as the silica precursor. More particularly, water glass can be used. That is, a second water glass solution is preferably added to the precursor solution to perform a gelation reaction.

Here, the second water glass solution can function as a basic catalyst as well as a silica precursor.

As such, in the present invention, a high concentration second water glass solution is included, without separately using a basic catalyst used to form an aerogel, thereby preparing a metal oxide-silica composite aerogel. Accordingly, production costs may be reduced, and a metal oxide-silica composite aerogel may be efficiently prepared due to a simplified process.

Meanwhile, in the gelation reaction of step 3, an impregnation reaction of metal ions can occur while forming a gelated material with a water glass solution. For example, the formation of a gelated material and an impregnation reaction can be induced by adding a high concentration second water glass solution to increase pH and thus form a basic condition.

The concentration of the second water glass solution can be 0.5 M to 6.0 M, preferably 1.0 M to 5.0 M, more preferably 1.2 M to 4.0 M. Here, the concentration of the second water glass solution means the concentration of water glass in the second water glass solution. That is, the second water glass solution can include water glass in the concentration range, and the concentration of water glass in the second water glass solution can be higher than the concentration of water glass in the first water glass solution.

In addition, when the concentration of the second water glass solution is less than 0.5 M, the gelated material forms a porous network structure having excessively large pores, and contraction thereof increases during drying, whereby a metal oxide-silica composite aerogel having poor properties such as a very small pore volume, very poor pore uniformity, and a high effective density of single particles can be formed. When the concentration of the second water glass solution is higher than 6.0 M, the gelated material may not form a porous network structure and may form a dense structure, whereby the specific surface area of a finally prepared metal oxide-silica composite aerogel may be deteriorated. In addition, basicity may rapidly increase, whereby a gelation reaction may rapidly occur and, accordingly, a non-uniform pore structure may be formed. Further, a porous network structure having excessively large pores may be formed, whereby a metal oxide-silica a composite aerogel having significantly low pore characteristics may be formed, as described above.

In addition, the second water glass solution can be added so that the pH of the precursor solution is 3 to 10, preferably 3.5 to 9.5, more preferably 4 to 8.

When the pH of the precursor solution is outside the range, gelation may not be easily performed, or processability may be decreased due to an excessively low gelation rate.

Here, a slow gelation reaction can be induced by slowly adding the second water glass solution, and the second water glass solution can be preferably added in a continuous manner or in a manner of repeatedly, periodically adding several times, but the present invention is not limited thereto. However, a method of adding the second water glass solution batchwise can induce a non-uniform reaction due to insufficient mixing between reaction solutions.

In addition, since the pH of the precursor solution prepared in step 2 is within a low pH range and previously includes a water glass solution as a component thereof, the precursor solution of the present invention is not immediately gelated although the second water glass solution is added and gelation as a whole is slowly performed while the second water glass solution is uniformly mixed, unlike a conventional manner wherein gelation is immediately performed around a position at which a water glass solution is added when the water glass solution is directly added to a metal ion solution.

As such, since a slow gelation reaction is induced by slowly adding the second water glass solution in the present invention, a network structure of a gelated material can be more uniformly formed.

In addition, the gelation reaction is not specifically limited and, for example, can be performed while stirring. The stirring can be performed at 10 rpm to 500 rpm, preferably 100 rpm to 300 rpm, with a magnetic bar or a mechanical mixer. The gelation reaction can be performed for 30 minutes to 5 hours, preferably 1 to 4 hours, more preferably 1 to 3 hours.

Here, the gelation reaction can be performed at 10 to 100° C., preferably 10 to 80° C., more preferably 20 to 60° C., even more preferably 25 to 50° C. Within these reaction temperature ranges, a reaction time is shortened, the efficiency of a preparation process is optimized, and the formation of a precipitate is prevented so that pore uniformity is improved.

In step 3, a basic catalyst can be further included although a high concentration second water glass solution is added.

The basic catalyst can be used in an amount at which the pH of the precursor solution is 3 to 10, preferably 3.5 to 9.5, more preferably 4 to 8.

The basic catalyst is not specifically limited and can be, for example, one or more of sodium hydroxide (NaOH), ammonia water (NH$_4$OH), and potassium hydroxide (KOH). Particularly, the basic catalyst can be sodium hydroxide.

The method according to an embodiment of the present invention can further include a step of washing the prepared metal oxide-silica composite wet gel. The washing can be performed to obtain a high-purity metal oxide-silica composite aerogel by removing impurities (e.g., an unreacted substance such as $Si^{4+}$, $Mg^{2+}$, or $Ca^{2+}$, a byproduct such as $Na^+$ or $Cl^-$, etc.) generated during reaction. The washing is not specifically limited and can be performed by a general method known in the art.

For example, the washing can be performed by adding distilled water or an organic solvent to the metal oxide-silica composite wet gel and stirring for 20 minutes to 1 hour. The organic solvent can be, without being specifically limited thereto, for example, an alcohol-based compound, a hydrocarbon-based compound, a ketone-based compound, or the like. More particularly, the organic solvent can be an alcohol-based compound such as methanol, ethanol, isopropanol, or propanol; a hydrocarbon-based compound such as hexane, octane, n-decane, n-heptane, n-undecane, cyclohexane, or toluene; a ketone-based compound such as methyl ethyl ketone or acetone; or a mixture of two or more thereof. When the washing is performed using an organic solvent, the organic solvent can be an alcohol-based compound which has excellent miscibility with water as a reactive solvent, can easily penetrate into pores inside silica gel particles, and exhibit a drying effect when the washing is combined with a subsequent drying process and resolve a pore contraction and deformation problem due to the drying process, and can be more particularly ethanol. When the alcohol-based compound is used, moisture present in the metal oxide-silica composite wet gel is replaced with an alcohol having relatively low surface tension, whereby contraction occurring during drying can be further suppressed.

The washing process can be performed according to a general washing method and can be repeated once or twice or more, particularly three to five times. When the washing process is performed twice or more, the same washing solvent or different washing solvents can be used. Particularly, a second washing process can be performed with a washing solvent including one or a mixture of two or more selected from the group consisting of methanol, tetrahydrofuran, toluene, and hexane after first washing with distilled water or ethanol.

In addition, the washing process of the method according to an embodiment of the present invention can further include a process of controlling a water content through solid/liquid separation.

The water content control process can be performed according to a general solid/liquid separation method using a vacuum filter or the like. More particularly, the water content control process can be performed so that a water content in a metal oxide-silica composite precipitate is 99% by weight or less, preferably 95% by weight or less, based on a total weight of the metal oxide-silica composite precipitate. By performing the water content control process through solid/liquid separation in this manner, a salt in and/or outside pores of the metal oxide-silica composite aerogel, as a final product, may be effectively removed, and processability may be increased while shortening a drying time.

The method according to an embodiment of the present invention can further include a step of drying the washed metal oxide-silica composite wet gel.

The drying step can be performed by a method such as heat treatment or hot air injection. A particular temperature and time in the drying step can be suitably adjusted depending upon a washing solvent type. Particularly, the drying step can be performed at 90° C. to 200° C. and can be performed under atmospheric pressure. The drying step can be performed while adjusting temperature, time, and the like such that a water content in the metal oxide-silica composite aerogel is 10% or less.

Meanwhile, "atmospheric pressure" refers to normal pressure, particularly a pressure which is not lowered or increased, and a separate high-pressure apparatus, such as an autoclave, is not used.

The method according to an embodiment of the present invention can include a step of preparing an acidic water glass solution, a step of adding a metal ion solution to the acidic water glass solution and uniformly mixing the same to prepare a precursor solution, and a step of slowly adding a high concentration second water glass solution to the precursor solution to induce a slow gelation reaction. Accordingly, a network structure and/or a uniform pore structure may be easily formed, whereby pore characteristics such as pore uniformity, a pore volume, a pore diameter, an effective pore volume, and a single particle effective density, a specific surface area, and a density reduction maybe significantly improved. Accordingly, a metal oxide-silica composite aerogel capable of realizing an ultra-light weight can be prepared.

In addition, the present invention provides a metal oxide-silica composite aerogel prepared by the method.

A metal oxide of the aerogel according to an embodiment of the present invention can be doped with silica. The metal oxide is not specifically limited so long as it can be fixed by a silanol group on a surface of a silica aerogel to form a composite aerogel. The metal oxide can include particularly one or more metals selected from the group consisting of alkali metals, alkaline earth metals, lanthanides, actinides, transition metals, and metals in Group 13 (IIIA), more particularly one or more metal elements selected from the group consisting of calcium (Ca), magnesium (Mg), copper (Cu), zinc (Zn), manganese (Mn), cadmium (Cd), lead (Pb), nickel (Ni), chromium (Cr), silver (Ag), titanium (Ti), vanadium (V), cobalt (Co), molybdenum (Mo), tin (Sn), antimony (Sb), strontium (Sr), barium (Ba), and tungsten (W). Even more particularly, the metal oxide can be magnesium oxide, calcium oxide, or a mixture thereof. That is, the metal oxide-silica composite aerogel according to an embodiment of the present invention can include magnesium oxide (MgO), calcium oxide (CaO), and silica (SiO$_2$).

Here, the doping is a process of adding a limited amount of foreign material to a pure material. For example, the doping can be a process of bonding a metal oxide into a network structure of silica.

In addition, the pore uniformity of the metal oxide-silica composite aerogel can be represented by a full width at half maximum (FWHM) value of a distribution curve in a pore diameter-dependent distribution diagram. The FWHM value can be 34 nm or less, preferably 0.1 to 15 nm or less, more preferably, 0.1 to 7 nm, even more preferably 0.1 to 5 nm.

Figure 3:
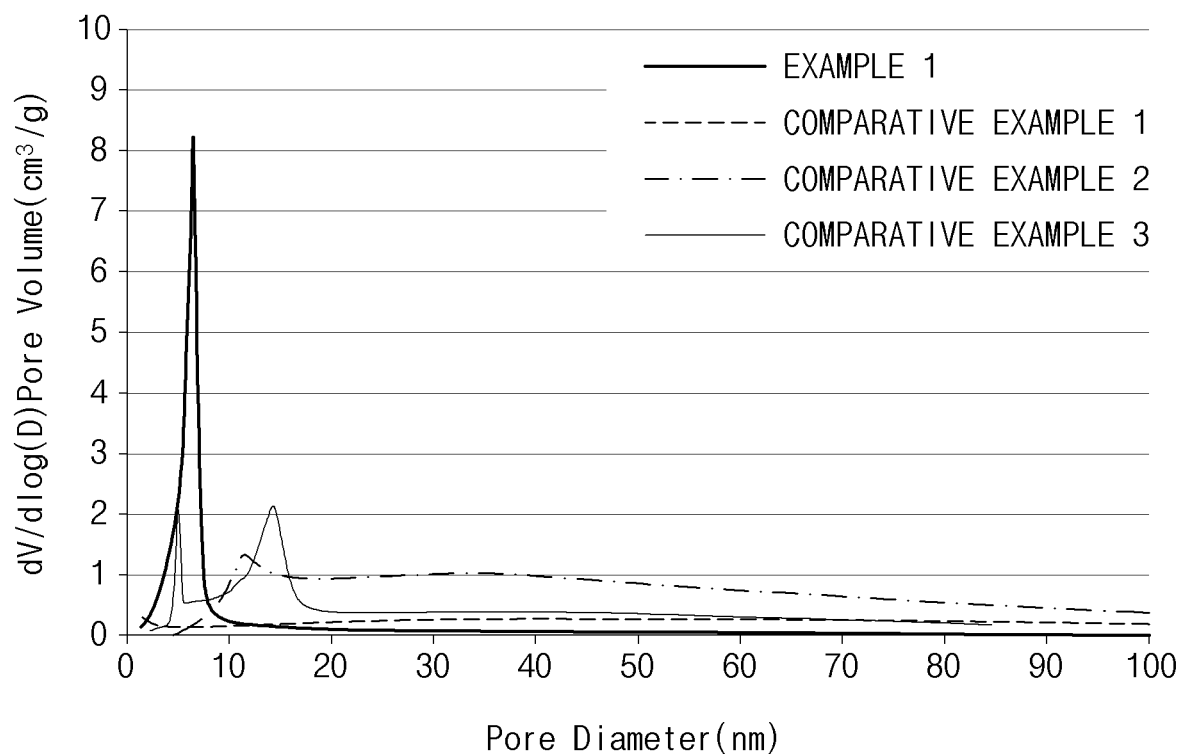
FIGS. 3 and 4 illustrate pore diameter-dependent distribution graphs of metal oxide-silica composite aerogels prepared by methods of preparing a metal oxide-silica composite aerogel according to an example of the present invention and comparative examples.
Figure 4:
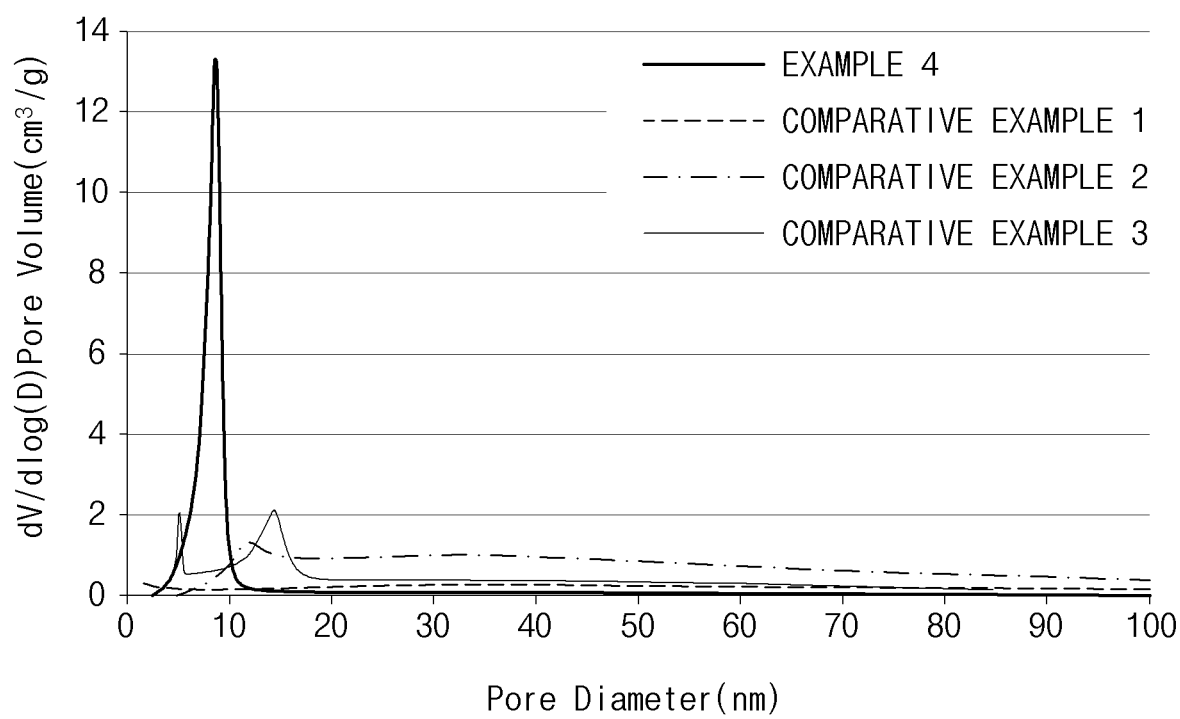

Here, the FWHM value, as a measure of pore uniformity, means an absolute value of a difference between two independent variable values which are half of a peak value in a pore diameter-dependent distribution, as shown in FIGS. 3 and 4.

A smaller FWHM value indicates that pore diameter distribution of the metal oxide-silica composite aerogel is narrow and thus a pore size is more uniform. On the other hand, a larger FWHM value indicates that pore particle diameter distribution is broad and thus a pore size is relatively non-uniform. Accordingly, an FWHM value in a pore diameter-dependent distribution represents the uniformity of a pore size, i.e., pore uniformity.

While a conventional aerogel has an FWHM value of 40 nm or more, a metal oxide-silica composite aerogel prepared by the method according to an embodiment of the present invention can have an FWHM value of 34 nm or less, preferably 15 nm or less, most preferably 5 nm or less. Accordingly, the present invention can provide a metal oxide-silica composite aerogel having significantly improved pore uniformity.

In addition, the metal oxide-silica composite aerogel prepared by the method according to an embodiment of the present invention can have a pore volume of 0.9 cm$^3$/g or more, preferably 1.0 to 3 cm$^3$/g, more preferably 1.3 to 2.5 cm$^3$/g.

In particular, the metal oxide-silica composite aerogel can have an effective pore volume of 0.9 cm$^3$/g or more, preferably 1 to 3 cm$^3$/g, more preferably 1.3 to 2.5 cm$^3$/g, thereby having an effective pore volume that is not greatly different from the aforementioned pore volume. That is, a ratio of an effective pore volume can be 0.8 or more, preferably 0.9 or more, more preferably 0.98 to 1, based on a measured total pore volume, which may indicate that the entirety or most of a pore volume in the metal oxide-silica composite aerogel is an effective pore volume.

Here, the effective pore volume can mean the volume of pores, into which penetration of a polymer resin is limited, when the metal oxide-silica composite aerogel is used as an additive for weight reduction. Particularly, the effective pore volume can be obtained from a cumulative pore volume at a pore diameter of about 50 nm or less. Since penetration of a polymer resin into pores occupying the effective pore volume is limited, a weight reduction property is superior as an effective pore volume and a ratio of the effective pore volume to a total pore volume are large.

While a conventional aerogel has a low effective pore volume of 0.5 to 0.8 cm$^3$/g, the metal oxide-silica composite aerogel prepared by the method according to an embodiment of the present invention can have an effective pore volume of 0.9 cm$^3$/g or more, most preferably 1.3 to 2.5 cm$^3$/g. Accordingly, a metal oxide-silica composite aerogel having an excellent weight reduction property can be provided.

The metal oxide-silica composite aerogel prepared by the method according to an embodiment of the present invention can have a single particle effective density of 0.7 g/ml or less, preferably 0.01 to 0.7 g/ml, more preferably 0.01 to 0.6 g/ml.

Here, the single particle effective density refers to the density of a metal oxide-silica composite aerogel substantially affecting weight reduction, except for a part into which a polymer resin penetrates, when the metal oxide-silica composite aerogel is applied as an additive and can be obtained according to Equation 1 below:

$$\text{(Single Particle Effective Density)} = \left[\frac{1}{\text{(Skeletal Density)}} + \text{(Effective Pore Volume)}\right]^{-1} \quad \text{[Equation 1]}$$

Single particle effective density: Effective density of single particles

Skeletal density: Density of metal oxide-silica composite aerogel itself

Effective pore volume: Cumulative pore volume of pores having a size of 50 nm or less in a metal oxide-silica composite aerogel Here, a lower single particle effective density means that the number of pores into which a polymer resin does not penetrate is large and thus a weight reduction property is superior. While a conventional aerogel has a single particle effective density of about 0.9 g/ml and thus poor applicability as an additive for reducing the weight of a polymer resin, the metal oxide-silica composite aerogel prepared by the method according to an embodiment of the present invention has a single particle effective density of 0.7 g/ml or less, most preferably 0.01 to 0.6 g/ml. Accordingly, the present invention can provide an aerogel that has an excellent weight reduction property and is capable of being used as an additive for reducing the weight of a polymer resin.

Here, the density of the metal oxide-silica composite aerogel itself can be measured by means of a gas pycnometer (AccuPyc 1340, manufactured by Micromeritics) at room temperature under atmospheric pressure.

In the present invention, "room temperature" can be a temperature that is not separately lowered or increased. In general, room temperature can be 20±5° C.

In addition, the metal oxide-silica composite aerogel prepared by the method according to an embodiment of the present invention can have a density reduction of 3% or more, preferably 4 to 20%, more preferably 5 to 20%.

Here, the density reduction can refer to a ratio (percentage) of a density, which is reduced by adding a predetermined amount of metal oxide-silica composite aerogel to a polypropylene resin, to the density of the polypropylene (PP) resin itself. That is, as a density reduction is large, the number of effective pores, into which a polymer resin does not penetrate, is large, which indicates a superior weight reduction property.

In addition, a pore diameter of the metal oxide-silica composite aerogel prepared by the method according to an embodiment of the present invention is not specifically limited and can be preferably 50 nm or less. When the pore diameter of the metal oxide-silica composite aerogel is larger than 50 nm, a polymer resin can penetrate into pores of the metal oxide-silica composite aerogel due to the large pores, whereby the weight reduction property of the metal oxide-silica composite aerogel may be deteriorated.

In addition, the metal oxide-silica composite aerogel can have a specific surface area of 300 m$^2$/g or more, preferably 500 m$^2$/g to 1500 m$^2$/g, more preferably 800 m$^2$/g to 1500 m$^2$/g.

In the present invention, the pore volume, the pore diameter, and the specific surface area can be a value analyzed by an adsorption/desorption amount of nitrogen according to a partial pressure ($0.11 < p/p_0 < 1$) by feeding 0.3 g of a sample, moisture and organic ingredients of which have been removed by performing pre-treatment at 150° C. under vacuum for 24 hours, into a BET measurer (ASAP 2010, manufactured by Micrometrics). Here, the specific surface area can refer to a BET specific surface area.

The metal oxide-silica composite aerogel according to an embodiment of the present invention prepared by the aforementioned method has an increased specific surface area, thus exhibiting porosity. In addition, the metal oxide-silica composite aerogel has excellent pore uniformity and improved pore characteristics such as an effective pore volume and a single particle effective density, whereby many effective pores into which a polymer resin cannot penetrate are present therein. Accordingly, the metal oxide-silica composite aerogel has an excellent weight reduction property.

Hereinafter, the present invention will be described in more detail with reference to the following examples and experimental examples. However, the examples and experimental examples are provided to exemplify the present invention, and the scope of the present invention is not limited thereto.

Example 1

A metal oxide-silica composite aerogel was prepared through the steps shown in FIG. 2.

In particular, hydrochloric acid (acid catalyst) was added to 200 ml of a 0.25 M water glass solution (first water glass solution) to prepare an acidic water glass solution. Here, the pH of the acidic water glass solution was 0.9. 200 ml of a 0.05 M metal ion solution having a molar ratio of $Mg^{2+}:Ca^{2+}=9:1$ was added to and stirred with the acidic water glass solution, thereby preparing a precursor solution. Here, the concentration of the precursor solution was 2.0 wt %. Subsequently, a gelation reaction was performed for 2 hours while slowly adding a 2.0 M water glass solution (second water glass solution) to the precursor solution at 25° C. until the pH of the precursor solution became 4.5, thereby preparing a metal oxide-silica composite wet gel. The prepared metal oxide-silica composite wet gel was subjected to solid/liquid separation to a water content of 95% or less while washing the same with a washing solvent including distilled water and ethanol. The washing was repeated four times. The washed metal oxide-silica composite wet gel was dried in a 125° C. oven for 6 hours under atmospheric pressure, thereby preparing a metal oxide-silica composite aerogel.

Example 2

A metal oxide-silica composite aerogel was prepared in the same manner as in Example 1, except that hydrochloric acid (HCl) was added to a first water glass solution until a pH became 0.95, and a second water glass solution was added until the pH of a precursor solution became 7.5.

Example 3

A metal oxide-silica composite aerogel was prepared in the same manner as in Example 1, except that hydrochloric acid (HCl) was added to a first water glass solution until a pH became 1.0, and a second water glass solution was added until the pH of a precursor solution became 9.5.

Example 4

Hydrochloric acid (acid catalyst) was added to 200 ml of a 0.125 M water glass solution (first water glass solution) to prepare an acidic water glass solution. Here, the pH of the acidic water glass solution was 0.9. 200 ml of a 0.025 M metal ion solution having a molar ratio of $Mg^{2+}:Ca^{2+}=9:1$ was added to and stirred with the acidic water glass solution, thereby preparing a precursor solution. Here, the concentration of the precursor solution was 1.0 wt %. Subsequently, a gelation reaction was performed for 2 hours while slowly adding a 1.0 M water glass solution (second water glass solution) to the precursor solution at 50° C. until the pH of the precursor solution became 7.5, thereby preparing a metal oxide-silica composite wet gel. The prepared metal oxide-silica composite wet gel was subjected to solid/liquid separation to a water content of 95% or less while washing the same with a washing solvent including distilled water and ethanol. The washing was repeated four times. The washed metal oxide-silica composite wet gel was dried in a 125° C. oven for 6 hours under atmospheric pressure, thereby preparing a metal oxide-silica composite aerogel.

Example 5

Hydrochloric acid (acid catalyst) was added to 200 ml of a 0.188 M water glass solution (first water glass solution) to prepare an acidic water glass solution. Here, the pH of the acidic water glass solution was 0.9. 200 ml of a 0.038 M metal ion solution having a molar ratio of $Mg^{2+}:Ca^{2+}=9:1$ was added to and stirred with the acidic water glass solution, thereby preparing a precursor solution. Here, the concentration of the precursor solution was 1.5 wt %. Subsequently, a gelation reaction was performed for 2 hours while slowly adding a 1.5 M water glass solution (second water glass solution) to the precursor solution at 25° C. until the pH of the precursor solution became 7.5, thereby preparing a metal oxide-silica composite wet gel. The prepared metal oxide-silica composite wet gel was subjected to solid/liquid separation to a water content of 95% or less while washing the same with a washing solvent including distilled water and ethanol. The washing was repeated four times. The washed metal oxide-silica composite wet gel was dried in a 125° C. oven for 6 hours under atmospheric pressure, thereby preparing a metal oxide-silica composite aerogel.

Example 6

Hydrochloric acid (acid catalyst) was added to 200 ml of a 0.375 M water glass solution (first water glass solution) to prepare an acidic water glass solution. Here, the pH of the acidic water glass solution was 0.9. 200 ml of a 0.075 M metal ion solution having a molar ratio of $Mg^{2+}:Ca^{2+}=9:1$ was added to and stirred with the acidic water glass solution, thereby preparing a precursor solution. Here, the concentration of the precursor solution was 3.0 wt %. Subsequently, a gelation reaction was performed for 2 hours while slowly adding a 3.0 M water glass solution (second water glass solution) to the precursor solution at 25° C. until the pH of the precursor solution became 7.5, thereby preparing a metal oxide-silica composite wet gel. The prepared metal oxide-silica composite wet gel was subjected to solid/liquid separation to a water content of 95% or less while washing the same with a washing solvent including distilled water and ethanol. The washing was repeated four times. The washed metal oxide-silica composite wet gel was dried in a 125° C. oven for 6 hours under atmospheric pressure, thereby preparing a metal oxide-silica composite aerogel.

Example 7

Hydrochloric acid (acid catalyst) was added to 200 ml of a 0.5 M water glass solution (first water glass solution) to prepare an acidic water glass solution. Here, the pH of the acidic water glass solution was 0.9. 200 ml of a 0.1 M metal ion solution having a molar ratio of $Mg^{2+}:Ca^{2+}=9:1$ was added to and stirred with the acidic water glass solution, thereby preparing a precursor solution. Here, the concentration of the precursor solution was 4.0 wt %. Subsequently, a gelation reaction was performed for 2 hours while slowly adding a 4.0 M water glass solution (second water glass solution) to the precursor solution at 50° C. until the pH of the precursor solution became 7.5, thereby preparing a metal oxide-silica composite wet gel. The prepared metal oxide-silica composite wet gel was subjected to solid/liquid separation to a water content of 95% or less while washing the same with a washing solvent including distilled water and ethanol. The washing was repeated four times. The washed metal oxide-silica composite wet gel was dried in a 125° C. oven for 6 hours under atmospheric pressure, thereby preparing a metal oxide-silica composite aerogel.

Example 8

A metal oxide-silica composite aerogel was prepared in the same manner as in Example 2, except that a gelation reaction was performed at 40° C.

Example 9

A metal oxide-silica composite aerogel was prepared in the same manner as in Example 2, except that a gelation reaction was performed at 60° C.

Example 10

A metal oxide-silica composite aerogel was prepared in the same manner as in Example 2, except that a gelation reaction was performed at 100° C.

Comparative Example 1

A metal oxide-silica composite aerogel was prepared through the steps shown in FIG. 1.

In particular, hydrochloric acid (acid catalyst) was added to 200 ml of a 0.25 M metal ion solution having a molar ratio of $Mg^{2+}:Ca^{2+}=9:1$, thereby preparing an acidic metal ion solution. Here, the pH of the acidic metal ion solution was 0.9. A precipitation reaction (gelation reaction) was performed for 2 hours while slowly adding a 2.0 M water glass solution to the acidic metal ion solution until the pH of the acidic metal ion solution became 4.5, thereby preparing a metal oxide-silica composite wet gel. The prepared metal oxide-silica composite wet gel was subjected to solid/liquid separation to a water content of 95% or less while washing the same with ethanol as a washing solvent. The washing was repeated four times. The washed metal oxide-silica composite wet gel was dried in a 125° C. oven for 6 hours under atmospheric pressure, thereby preparing a metal oxide-silica composite aerogel.

Comparative Example 2

Hydrochloric acid (acid catalyst) was added to 200 ml of a 0.5 M water glass solution until a pH became 4.0 and a gelation reaction was performed, thereby preparing a silica wet gel. 100 ml of a 0.25 M metal ion solution having a molar ratio of $Mg^{2+}:Ca^{2+}=9:1$ and a 2.0 M water glass solution were added to the silica wet gel until a pH became 7.5, and a second gelation reaction was performed, thereby preparing a metal oxide-silica composite wet gel. Washing and drying processes were performed in the same manner as in Comparative Example 1, thereby preparing a metal oxide-silica composite aerogel.

Comparative Example 3

Hydrochloric acid was added to 200 ml of a 0.5 M water glass solution until a reaction pH became 4.0 and a gelation reaction was performed, thereby preparing a silica wet gel. 100 ml of a 2.0 M metal ion solution having a molar ratio of a molar ratio of $Mg^{2+}:Ca^{2+}=9:1$ and a 2.0 M water glass solution were added to the silica wet gel until a reaction pH became 7.5, and a second gelation reaction was performed, thereby preparing a metal oxide-silica composite wet gel. Washing and drying processes were performed in the same manner as in Comparative Example 1, thereby preparing a metal oxide-silica composite aerogel.

Synthesis conditions of the metal oxide-silica composite aerogels of Examples 1 to 10 and Comparative Examples 1 to 3 are summarized in Table 1 below.

TABLE 1

|  | pH after addition of second water glass solution | Concentration of precursor solution* (wt %) | Gelation temperature (° C.) |
| --- | --- | --- | --- |
| Example 1 | 4.5 | 2.0 | 25 |
| Example 2 | 7.5 | 2.0 | 25 |
| Example 3 | 9.5 | 2.0 | 25 |
| Example 4 | 7.5 | 1.0 | 50 |
| Example 5 | 7.5 | 1.5 | 25 |
| Example 6 | 7.5 | 3.0 | 25 |
| Example 7 | 7.5 | 4.0 | 50 |
| Example 8 | 7.5 | 2.0 | 40 |
| Example 9 | 7.5 | 2.0 | 60 |
| Example 10 | 7.5 | 2.0 | 100 |
| Comparative Example 1 | — | — | 25 |
| Comparative Example 2 | — | — | 25 |
| Comparative Example 3 | — | — | 25 |

*Precursor solution: "Precursor solution" in Table 1 is a solution prepared by mixing an acidic water glass solution with a metal ion solution, i.e., a solution prepared by mixing a water glass solution, a metal ion solution, and an acid catalyst.

Experimental Example

To compare the properties of the metal oxide-silica composite aerogels prepared in Examples 1 to 10 and Comparative Examples 1 to 3, the pore volume ($cm^3/g$), pore diameter (nm), and effective pore volume ($cm^3/g$) of each of the metal oxide-silica composite aerogels were measured. Pore uniformity (FWHM, nm), a single particle effective density (g/ml), a density reduction (%), and a value of effective pore volume (P.V.)/measured P.V. were calculated using the measured values. Results are summarized in Table 2 below.

1) Pore Volume ($V_{pore}$, $cm^3/g$) and Average Pore Diameter ($D_{pore}$, nm)

A pore volume and an average pore diameter were measured by an adsorption/desorption amount of nitrogen according to a partial pressure ($0.11 < p/p_0 < 1$) using an ASAP 2010 apparatus (manufactured by Micromeritics).

In particular, 0.3 g of a sample, moisture and organic ingredients of which have been removed by performing pre-treatment at 150° C. under vacuum for 24 hours, was fed into a BET measurer (ASAP 2010, manufactured by Micrometrics) to measure a pore volume and an average pore diameter.

2) Pore Uniformity (FWHM, nm)

As shown in FIGS. 3 and 4, FWHM was calculated as an absolute value of a difference between two independent variable values which are half of a peak value in a pore diameter-dependent distribution.

3) Measurement of Effective Pore Volume ($cm^3/g$) and Value of Effective P.V./Measured P.V.

An effective pore volume was calculated as a cumulative amount of a total volume of pores having a pore diameter of 50 nm or less at the pore volume measured in 1). A value of effective P.V./measured P.V. is a value obtained by dividing a calculated effective pore volume by the pore volume measured in 1).

4) Single Particle Effective Density (g/ml)

After measuring the density of a metal oxide-silica composite aerogel itself (skeletal density) at room temperature under atmospheric pressure by means of a gas pycnometer (AccuPyc 1340, manufactured by Micromeritics), a single particle effective density was calculated according to Equation 1 below using the measured effective pore volume. As the single particle effective density is low, the number of effective pores, into which a polymer resin does not penetrate, is large. Such an aerogel exhibits an excellent weight reduction property when applied as an additive.

$$(\text{Single Particle Effective Density}) = \left[\frac{1}{(\text{Skeletal Density})} + (\text{Effective Pore Volume})\right]^{-1} \quad [\text{Equation 1}]$$

Single particle effective density: Effective density of single particles

Skeletal density: Density of metal oxide-silica composite aerogel itself

Effective pore volume: Cumulative pore volume of pores having a size of 50 nm or less in a metal oxide-silica composite aerogel 5) Density Reduction (%)

Density reduction (%) is a value obtained by calculating a ratio of the density reduced by adding a predetermined amount of metal oxide-silica composite aerogel to a polypropylene resin to the density of the polypropylene (PP) resin itself as a percentage.

Table 2 below shows measured property values of Examples 1 to 10 and Comparative Examples 1 to 3.

parative Examples 1 to 3. Accordingly, it can be confirmed that the metal oxide-silica composite aerogels of Examples 1 to 3 exhibit an excellent single particle effective density, density reduction and effective pore volume relative to an entire pore volume.

In particular, it can be confirmed that the metal oxide-silica composite aerogels of Examples 1 to 10 have larger pore volumes and exhibit a cumulative pore volume at a pore diameter of 50 nm or less, into which it is difficult to penetrate a polymer, compared to Comparative Examples 1 to 3, whereby the effective pore volume thereof substantially affecting a weight reduction property is also large. In particular, it can be confirmed that, in the metal oxide-silica composite aerogels of Examples 1 to 10, a ratio of an effective pore volume to a pore volume is close to 1 and thus most pores present in the aerogels are effective pores having weight reduction improvement effects. As such, it can be confirmed that, in the metal oxide-silica composite aerogels of Examples 1 to 10, a pore volume is large and, particularly, a ratio of an effective pore volume is large, whereby the single particle effective density is also remarkably reduced.

In addition, it can be confirmed that, in the metal oxide-silica composite aerogels of Examples 1 to 10, an FWHM value representing pore uniformity is very small, compared to those of Comparative Examples 1 to 3. On the other hand, it can be confirmed that, in the metal oxide-silica composite aerogels of Comparative Examples 1 to 3, a distribution curve is very broad or two or more peaks are formed in a pore diameter-dependent distribution, whereby an FWHM value is not calculated, the accuracy of the FWHM value is low although it is calculated, or the FWHM value is very large, which indicates that pore uniformity is poor.

Meanwhile, the pore characteristics of the aerogels can also be confirmed from FIGS. 3 and 4 of the present invention. FIG. 3 shows a pore diameter-dependent distribution of Example 1 and Comparative Examples 1 to 3, and FIG. 4 illustrates a pore diameter-dependent distribution of

TABLE 2

|  | Pore volume (cm³/g) | Pore diameter (nm) | Pore uniformity (FWHM, nm) | Effective pore volume (cm³/g) | Single particle effective density (g/ml) | Density reduction (%) | Effective P.V.*/ measured P.V. |
|---|---|---|---|---|---|---|---|
| Example 1 | 1.69 | 6.93 | 1.44 | 1.67 | 0.46 | 8.5 | 0.990 |
| Example 2 | 1.16 | 5.31 | 1.65 | 1.16 | 0.61 | 4.6 | 1.000 |
| Example 3 | 1.33 | 22.01 | 4.63 | 1.32 | 0.56 | 5.6 | 1.000 |
| Example 4 | 1.46 | 9.34 | 1.62 | 1.43 | 0.52 | 6.8 | 0.980 |
| Example 5 | 1.23 | 4.75 | 1.14 | 1.23 | 0.58 | 5.1 | 1.000 |
| Example 6 | 1.73 | 9.72 | 6.51 | 1.73 | 0.45 | 9.2 | 1.000 |
| Example 7 | 1.70 | 21.16 | 29.03 | 1.64 | 0.47 | 8.5 | 0.960 |
| Example 8 | 1.77 | 12.95 | 4.87 | 1.76 | 0.45 | 9.3 | 0.990 |
| Example 9 | 2.24 | 26.28 | 12.15 | 2.22 | 0.39 | 12.5 | 0.992 |
| Example 10 | 2.24 | 26.99 | 32.69 | 1.90 | 0.63 | 10.1 | 0.848 |
| Comparative Example 1 | 0.40 | 8.42 | — (Calculation impossible) | 0.27 | 1.32 | −3.3 | 0.680 |
| Comparative Example 2 | 1.12 | 16.56 | 43.05 | 0.82 | 0.79 | 1.4 | 0.730 |
| Comparative Example 3 | 0.87 | 8.24 | — (Calculation impossible) | 0.75 | 0.84 | 0.7 | 0.860 |

*P.V.: Pore volume

As shown in Table 2, it can be confirmed that the metal oxide-silica composite aerogels of Examples 1 to 3 prepared according to an embodiment of the present invention exhibit a larger pore volume and, particularly, remarkably improved pore uniformity (FWHM) and effective pore volume, compared to the metal oxide-silica composite aerogels of Com- Example 4 and Comparative Examples 1 to 3. Examining FIGS. 3 and 4, it can be confirmed that the metal oxide-silica composite aerogels of Examples 1 and 4 have a very narrow pore diameter distribution curve and a pore diameter peak formed at a very small value, whereas the metal oxide-silica composite aerogels of Comparative Examples 1 to 3 prepared respectively using conventional methods all have broad pore diameter distribution curves and, in the case when peaks are formed, have two or more peaks. From these results, it can be confirmed that the pore uniformity of the aerogels according to the examples of the present invention is significantly superior to that of Comparative Examples 1 to 3. In addition, it can be confirmed that, in the aerogels according to the examples, the diameters of most pores are small, whereby effective pores, into which penetration of a polymer resin is limited, occupy most of the entire pores.

In addition, it can be confirmed that, in the case of the aerogels of Examples 1 to 10, the densities of the aerogels are sharply reduced, compared to the density of the polypropylene resin itself, when added as an additive to the polypropylene resin. On the other hand, it can be confirmed that the density reduction of Comparative Examples 1 to 3 are lower than those of the examples and, particularly, the aerogel of Comparative Example 1 exhibits a further increased density, when added as an additive to a polypropylene resin, and thus a decreased effect as an additive for weight reduction.

In addition, since, in Comparative Examples 1 to 3, since a step of mixing metal ions with a water glass solution is omitted and gelation immediately occurs as soon as metal ions contact the water glass solution or metal ions are mixed with the metal ion solution in a wet gel state to prepare a metal oxide-silica composite aerogel, unlike Examples 1 to 10, the metal is relatively non-uniformly present in the aerogel, compared to Examples 1 to 10. Accordingly, when the metal oxide-silica composite aerogels prepared according to Comparative Examples 1 to 3 are used as additives, it can be confirmed that mechanical strength is decreased and pore characteristics are decreased overall due to a non-uniform network structure of the metal and the silica. In addition, it can be confirmed that, in the case of Comparative Example 1 in which the water glass solution was slowly added similarly to Examples 1 to 10, gelation immediately occurs as soon as metal ions contact the water glass solution because the water glass solution is added to an acidic metal ion solution, whereby the concentration of silica in the composite aerogel is non-uniform, which causes deterioration of pore characteristics as described above.

From the experimental results, it can be confirmed that, in preparing the metal oxide-silica composite aerogel of the present invention, the metal ion solution is mixed in an acidic water glass solution state such that precipitation does not occur, and a high concentration water glass solution is slowly gelated to strengthen the internal network structure so that the pore volume increases, an effective pore volume and an effective density are improved, and a uniform pore structure is formed. Accordingly, an aerogel useful as an additive for weight reduction can be prepared.

The invention claimed is:

1. A method of preparing a metal oxide-silica composite aerogel, the method comprising:
   1) adding an acid catalyst to a first water glass solution to prepare an acidic water glass solution;
   2) adding a metal ion solution to the acidic water glass solution to prepare a precursor solution; and
   3) adding a second water glass solution to the precursor solution and performing a gelation reaction.

2. The method according to claim 1, wherein a pH of the acidic water glass solution is 0.1 to 2.9.

3. The method according to claim 1, wherein a reaction temperature while performing the gelation reaction is 10 to 100° C.

4. The method according to claim 1, wherein a reaction temperature while performing a gelation reaction is 10 to 80° C.

5. The method according to claim 1, wherein a concentration of the precursor solution is 0.1 to 3.9% by weight based on 1 L of a solvent.

6. The method according to claim 1, wherein a concentration of the precursor solution is 0.1 to 3.0% by weight based on 1 L of a solvent.

7. The method according to claim 1, wherein a concentration of the first water glass solution is 0.01 M to 2.0 M.

8. The method according to claim 1, wherein a concentration of the metal ion solution is 0.01 M to 2.0 M.

9. The method according to claim 1, wherein a concentration of the second water glass solution is 0.5 M to 6.0 M.

10. The method according to claim 1, wherein a concentration of the second water glass solution is higher than a concentration of the first water glass solution.

11. The method according to claim 1, wherein the second water glass solution is added that a pH of the precursor solution becomes 3 to 10.

12. The method according to claim 1, wherein the metal ion solution comprises ions of one or more metals selected from the group consisting of alkali metals, alkaline earth metals, lanthanides, actinides, transition metals, and metals in Group 13 (IIIA).

13. The method according to claim 1, wherein the metal ion solution is a binary metal ion solution comprising calcium ions ($Ca^{2+}$) and magnesium ions ($Mg^{2+}$).

14. The method according to claim 13, wherein a molar ratio of the calcium ions ($Ca^{2+}$) to the magnesium ions ($Mg^{2+}$) in the metal ion solution is 1:1 to 1:20.

15. The method according to claim 1, wherein the acid catalyst is one or more acids selected from the group consisting of hydrochloric acid, nitric acid, acetic acid, sulfuric acid, and hydrofluoric acid.

16. The method according to claim 1, further comprising washing and drying after performing the gelation reaction.

* * * * *

UNITED STATES PATENT AND TRADEMARK OFFICE
CERTIFICATE OF CORRECTION

PATENT NO. : 11,279,625 B2
APPLICATION NO. : 16/492017
DATED : March 22, 2022
INVENTOR(S) : Jong Hun Kim et al.

It is certified that error appears in the above-identified patent and that said Letters Patent is hereby corrected as shown below:

On the Title Page

On Page 2, Column 2, Lines 17-20, should read:
Shimadzu Corporation, "Total pore volume and average pore diameter in gas adsorption method," published online on Sep. 10, 2020, retrieved from < https://www.an.shimadzu.co.jp/powder/lecture/practice/p02/lesson14.htm > [English Translation included].

Signed and Sealed this
Nineteenth Day of July, 2022

Katherine Kelly Vidal
*Director of the United States Patent and Trademark Office*